(12) United States Patent
Robbins

(10) Patent No.: US 10,549,328 B2
(45) Date of Patent: Feb. 4, 2020

(54) DUMMY BLOCK FOR EXTRUSION PRESS

(71) Applicant: EXCO TECHNOLOGIES LIMITED, Markham (CA)

(72) Inventor: Paul Henry Robbins, Port Perry (CA)

(73) Assignee: Exco Technologies Limited, Markham, Ontario (CA)

( * ) Notice: Subject to any disclaimer, the term of this patent is extended or adjusted under 35 U.S.C. 154(b) by 520 days.

(21) Appl. No.: 15/342,337

(22) Filed: Nov. 3, 2016

(65) Prior Publication Data
US 2017/0128996 A1 May 11, 2017

Related U.S. Application Data

(60) Provisional application No. 62/252,130, filed on Nov. 6, 2015.

(51) Int. Cl.
| | | |
|---|---|---|
| *B21C 26/00* | (2006.01) | |
| *B21C 23/00* | (2006.01) | |
| *B21C 25/06* | (2006.01) | |
| *F16B 21/04* | (2006.01) | |
| *F16B 21/02* | (2006.01) | |
| *F16B 21/08* | (2006.01) | |

(52) U.S. Cl.
CPC .............. *B21C 26/00* (2013.01); *B21C 23/00* (2013.01); *B21C 25/06* (2013.01); *F16B 21/02* (2013.01); *F16B 21/04* (2013.01); *F16B 21/08* (2013.01)

(58) Field of Classification Search
CPC ......... B21C 23/00; B21C 25/06; B21C 26/00; B21C 33/00; F16B 21/02; F16B 21/04; F16B 21/08; Y10T 403/7005; Y10T 403/7007

USPC ...................... 72/253.1–273.5; 403/348, 349
See application file for complete search history.

(56) References Cited

U.S. PATENT DOCUMENTS

| | | | | |
|---|---|---|---|---|
| 4,550,584 A | * | 11/1985 | Degen ..................... | B21C 26/00 72/273 |
| 5,272,900 A | * | 12/1993 | Robbins .................. | B21C 26/00 72/273 |
| 5,771,734 A | * | 6/1998 | Robbins .................. | B21C 26/00 72/273 |
| 5,918,498 A | | 7/1999 | Robbins | |

(Continued)

FOREIGN PATENT DOCUMENTS

| | | | | |
|---|---|---|---|---|
| CN | 102151712 A | * | 8/2011 | ............. B21C 26/00 |
| CN | 102151712 A | | 8/2011 | |

(Continued)

OTHER PUBLICATIONS

Machine translation for CN 102151712, Zhao et al., retrieved Aug. 13, 2019, pp. 1-6. (Year: 2019).*

(Continued)

*Primary Examiner* — David B Jones

(57) ABSTRACT

A dummy block for a metal extrusion press comprises: a generally cylindrical base having a forward surface and an outwardly extending circumferential flange; an expandable collar coupled to the base, the collar having an inwardly extending circumferential rib abutting the circumferential flange; a collar support coupled to the base and abutting the collar; and a moveable plunger coupled to the base and accommodated by the collar. The plunger has a rear surface configured to abut the forward surface of the base.

19 Claims, 6 Drawing Sheets

(56) References Cited

U.S. PATENT DOCUMENTS

| | | | | |
|---|---|---|---|---|
| 6,688,831 B2* | 2/2004 | Antonucci | ................ | F16B 5/06 411/550 |
| 2012/0051831 A1* | 3/2012 | Waters, Jr. | .............. | E01C 11/14 403/11 |
| 2015/0336148 A1 | 11/2015 | Robbins | | |

FOREIGN PATENT DOCUMENTS

| | | | | |
|---|---|---|---|---|
| DE | 100 36 463 A1 | 2/2002 | | |
| DE | 10036463 A1 * | 2/2002 | ............. | B21C 26/00 |

OTHER PUBLICATIONS

PCT/CA2016/051285 International Search and Written Opinion, dated Jan. 11, 2017.

* cited by examiner

DUMMY BLOCK FOR EXTRUSION PRESS

CROSS-REFERENCE TO RELATED APPLICATION

The application claims the benefit of U.S. Application No. 62/252,130 filed on Nov. 6, 2015, the content of which is incorporated herein by reference in its entirety.

FIELD

The present invention relates generally to extrusion and in particular, to a dummy block for an extrusion press.

BACKGROUND

Metal extrusion presses are known in the art, and are used for forming extruded metal products having cross-sectional shapes that generally conform to the shape of the extrusion dies used. A typical metal extrusion press comprises a generally cylindrical container having an outer mantle and an inner tubular liner. The container serves as a temperature controlled enclosure for a billet during extrusion. An extrusion ram is positioned adjacent one end of the container. The end of the extrusion ram abuts a dummy block, which in turn abuts the billet allowing the billet to be advanced through the container. An extrusion die is positioned adjacent the opposite end of the container.

During operation, once the billet is heated to a desired extrusion temperature (typically 800-900° F. for aluminum), it is delivered to the extrusion press. The extrusion ram and dummy block are then advanced, so as to push the billet through the container and towards the extrusion die. Under the pressure exerted by the advancing extrusion ram and dummy block, the billet is extruded through the profile provided in the extrusion die until all or most of the billet material is pushed out of the container, resulting in the extruded product.

Dummy blocks for extrusion presses have been previously described. For example, U.S. Pat. No. 5,918,498 to Robbins discloses a dummy block having a dummy block base, a connector for connecting the dummy block base to a stem of an extruder, a replaceable wear ring connected to a forward circumferential portion of the dummy block base, a device for releasably securing the wear ring to the dummy block base, and a device for expanding the ring to engage an inside wall of a container of an extrusion press during extrusion. The wear ring is a metal collar having a conical interior surface converging towards the dummy block base. The device for expanding the ring comprises a metal plunger having a plunger head with a conical surface for engaging the collar conical surface to expand the collar as the plunger head is forced into the collar during extrusion. The converging surfaces of the collar and the plunger head extend a sufficient distance to permit telescoping of the plunger head into the collar to an extent whereby the collar is expanded to engage the inside wall of the container.

U.S. Patent Application Publication No. 2015/0336148 to Robbins discloses a dummy block for a metal extrusion press comprises a base having a first surface; an expandable collar seated against the base; a moveable plunger coupled to the base and accommodated by the collar, the plunger having a second surface configured to abut against the first surface of the base; and an outer connecting ring coupling the collar to the base. The connecting ring comprises at least one feature engaging the base and a plurality of fingers engaging the collar.

Improvements are generally desired. It is therefore an object at least to provide a novel dummy block for an extrusion press.

SUMMARY

In one aspect, there is provided a dummy block for a metal extrusion press comprising: a generally cylindrical base having a forward surface and an outwardly extending circumferential flange; an expandable collar coupled to the base, the collar having an inwardly extending circumferential rib abutting the circumferential flange; a collar support coupled to the base and abutting the collar; and a moveable plunger coupled to the base and accommodated by the collar, the plunger having a rear surface configured to abut the forward surface of the base.

The collar support and the base may define an annular groove accommodating the circumferential rib.

The circumferential rib may have a forward rib surface abutting a rear flange surface of the circumferential flange. The collar and the dummy block base may engage each other in an interlocking manner.

One or both of the collar and the collar support may be coupled to the base by shrink-fitting.

The circumferential flange may define a portion of the forward surface.

The plunger may comprise a convex face configured to abut a billet during use.

The dummy block may further comprise a rearward-extending stud or elongate projection for connecting the dummy block to an extrusion ram. The stud or elongate projection may comprise a central body and a plurality of lugs extending therefrom, each lug having a tapered rear portion blending the lug into the central body.

In one embodiment, there is provided use of the dummy block in a metal extrusion press for carrying out metal extrusion. In another embodiment, there is provided a metal extrusion press comprising the dummy block.

In another aspect, there is provided a metal extrusion press comprising: a dummy block having: a generally cylindrical base having a forward surface and an outwardly extending circumferential flange, an expandable collar coupled to the base, the collar having an inwardly extending circumferential rib abutting the circumferential flange, a collar support coupled to the base and abutting the collar, and a moveable plunger coupled to the base and accommodated by the collar, the plunger having a rear surface configured to abut the forward surface of the base; a stud or elongate projection coupled to the base; and an extrusion ram abutting the dummy block and having a central cavity accommodating the stud or elongate projection, a portion of the central cavity having a concave rear surface.

The stud or elongate projection may comprise a central body and a plurality of lugs extending therefrom, the portion of the central cavity having the concave rear surface being configured to accommodate the lugs. Each of the lugs may have a tapered rear portion blending the lug into the central body.

BRIEF DESCRIPTION OF THE DRAWINGS

Embodiments will now be described more fully with reference to the accompanying drawings in which.

DETAILED DESCRIPTION OF EMBODIMENTS

Figure 1:
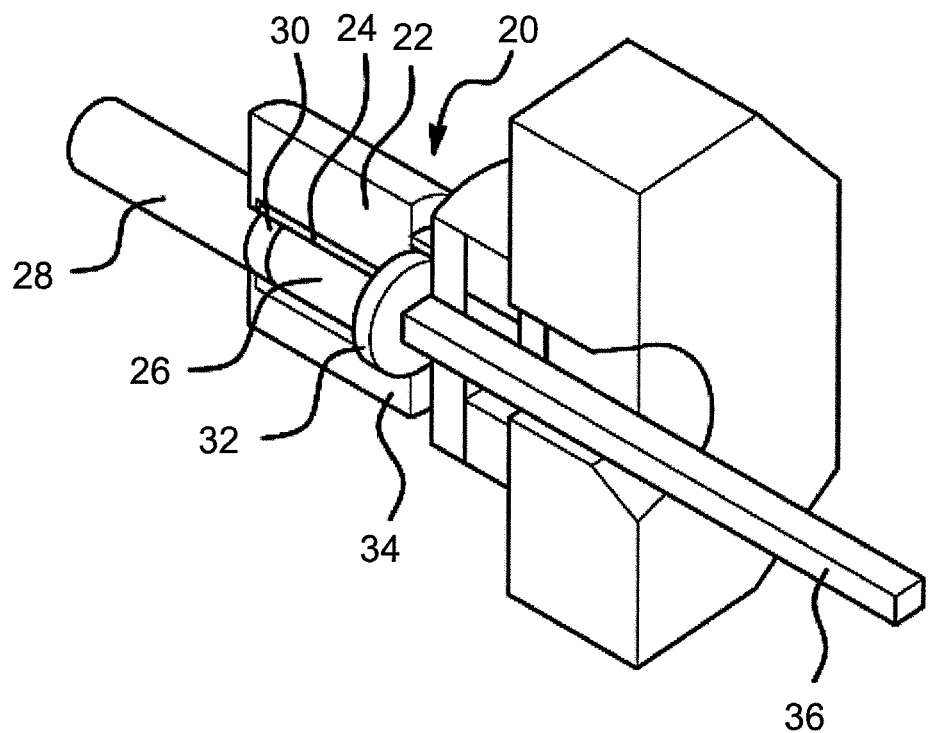
FIG. 1 is a schematic perspective view of a metal extrusion press.
Figure 2:
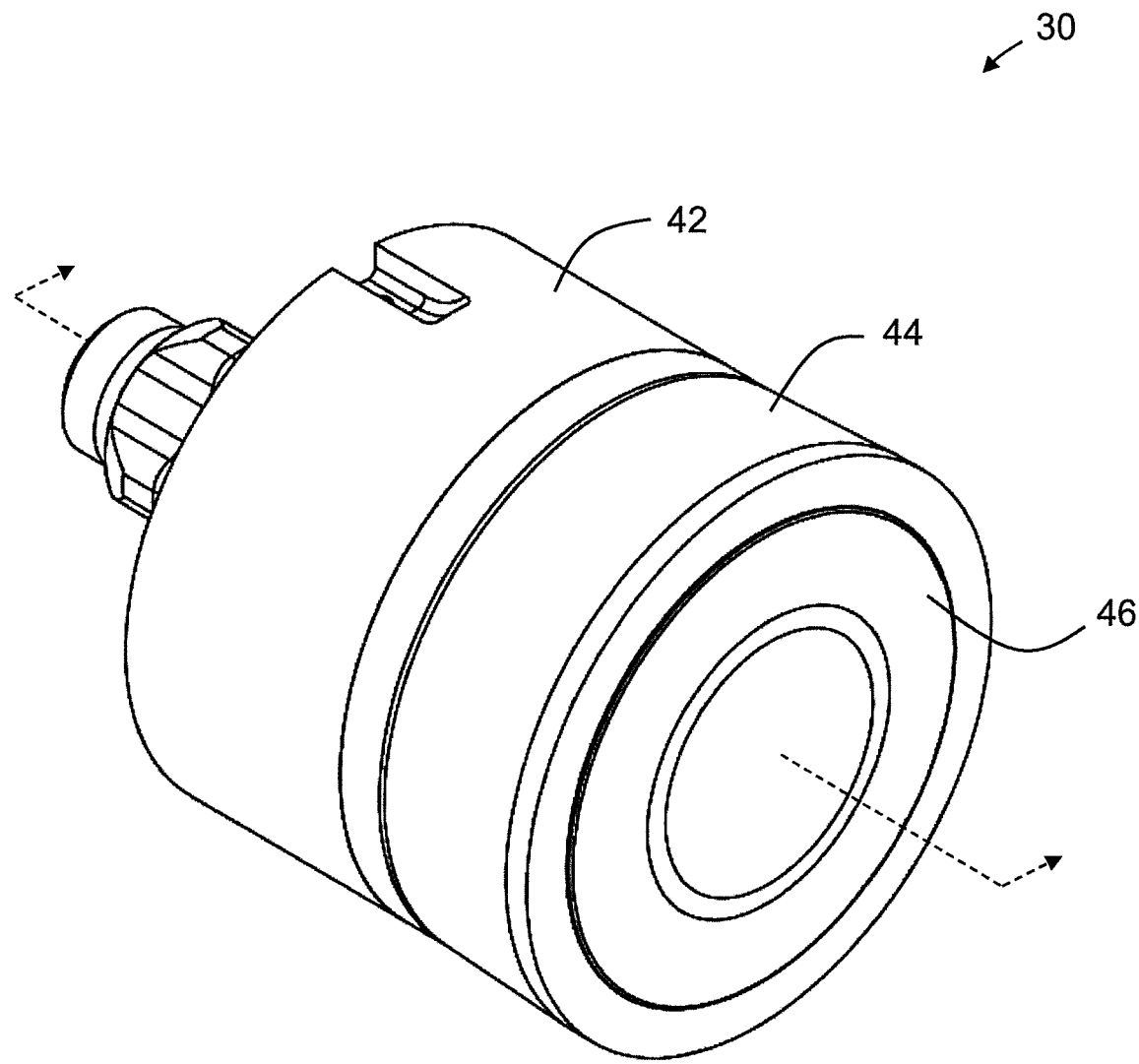
FIG. 2 is a perspective view of a dummy block forming part of the metal extrusion press of FIG. 1.
Figure 3:
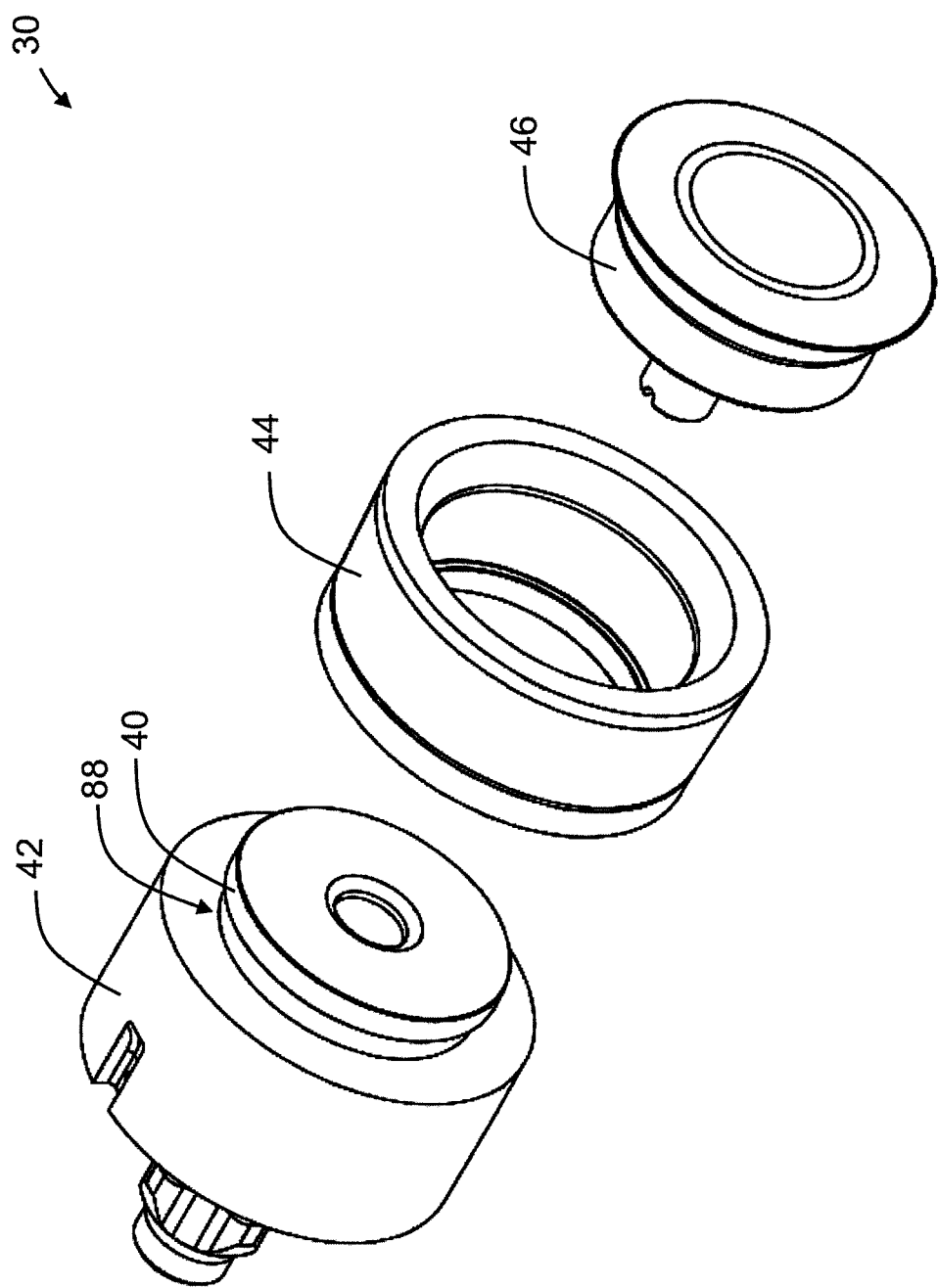
FIG. 3 is an exploded perspective view of the dummy block of FIG. 2.
Figure 4:
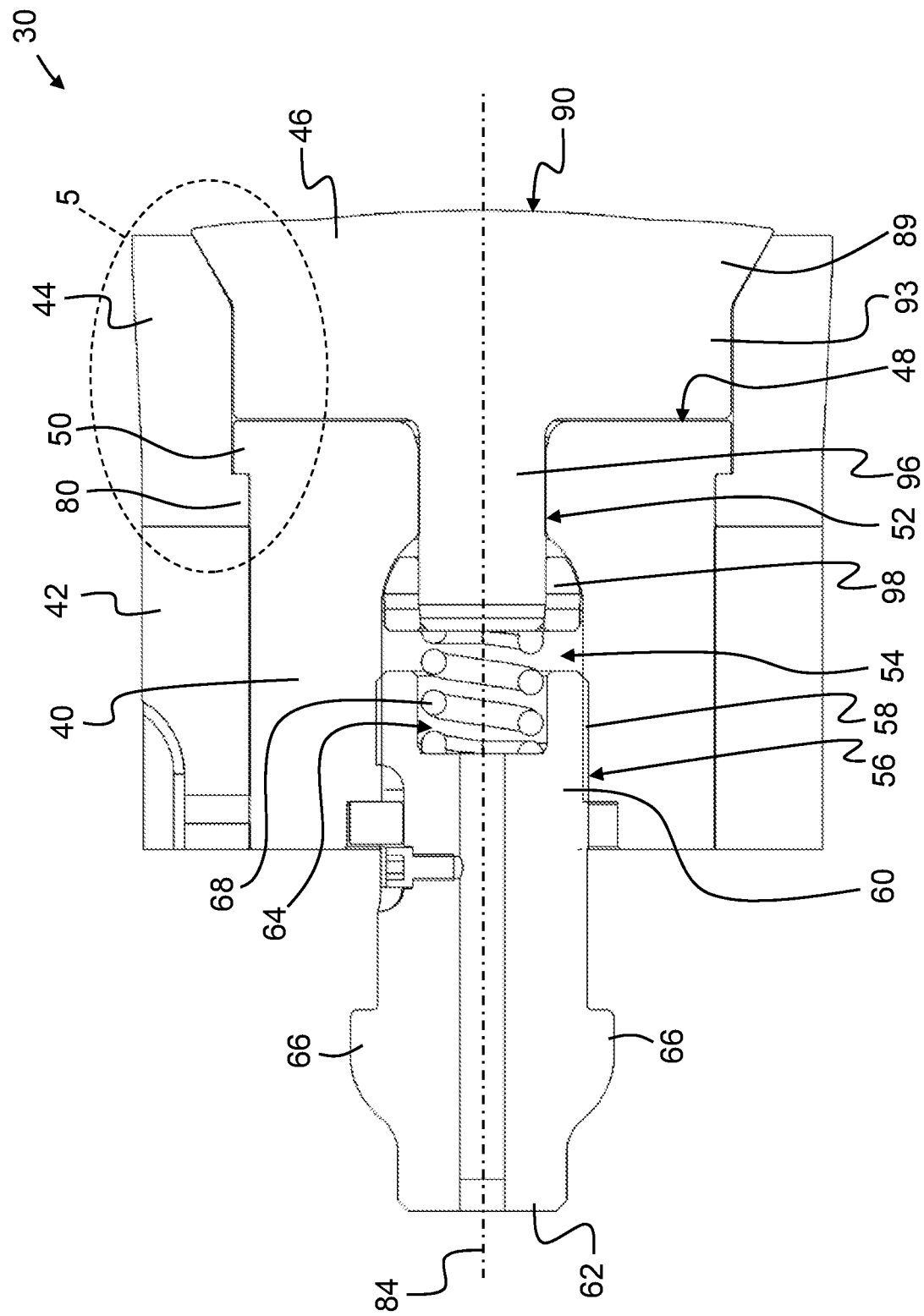
FIG. 4 is a side sectional view of the dummy block of FIG. 2, taken along the indicated section line.

FIG. 1 is a simplified illustration of an extrusion press for use in metal extrusion. The extrusion press comprises a container 20 having an outer mantle 22 that surrounds an inner tubular liner 24. The container 20 serves as a temperature controlled enclosure for a billet 26 during extrusion of the billet. An extrusion ram 28 is positioned adjacent one end of the container 20. The end of the extrusion ram 28 has a dummy block 30 coupled thereto, which is configured to abut the billet 26 for advancing the billet through the container 20. An extrusion die 32 is positioned adjacent a die end 34 of the container 20.

During operation, once the billet 26 is heated to a desired extrusion temperature (typically 800-900° F. for aluminum), it is delivered to the extrusion press. The extrusion ram 28 with the dummy block 30 coupled thereto are then advanced, so as to push the billet 26 through the container and towards the extrusion die 32. Under the pressure exerted by the advancing extrusion ram 28 and dummy block 30, the billet 26 is extruded through the profile provided in the extrusion die 32 until all or most of the billet material is pushed out of the container 20, resulting in the extruded product 36.

The dummy block 30 may be better seen in FIGS. 2 to 5. Dummy block 30 comprises an inner dummy block base 40, an outer collar support 42 coupled to the dummy block base 40, a replaceable collar 44 coupled to the dummy block base 40 and seated against the collar support 42, and a moveable plunger 46 positioned forward of the dummy block base 40 and within the collar 44. The plunger 46 is configured to move rearward when the dummy block 30 abuts a billet 26 during use, which in turn causes the collar 44 to expand.

The dummy block base 40 comprises a generally cylindrical body having a planar forward surface 48. A circumferential flange 50 extends outwardly from the dummy block base 40 at its forward end, and defines a portion of the planar forward surface 48. The dummy block base 40 has a center bore 52 extending from the planar forward surface 48 to a central recess 54. The dummy block base 40 further comprises a plurality of threads 56 formed on an interior surface defining the central recess 54, and which are configured to engage complimentary outer threads 58 formed on an exterior surface of a stem 60 of a stud 62 or other elongate projection. The stem 60 has a central recess 64 for accommodating a spring 68 that is configured to provide a biasing force urging the plunger 46 away from the planar forward surface 48 of the dummy block base 40. The stud 62 or other elongate projection is mounted on a forward end of the extrusion ram 28, and comprises four (4) spaced-apart lugs 66 that are configured to abut corresponding lugs of the extrusion ram 28, as described below.

The collar 44 comprises a generally annular body, and is coupled to the dummy block base 40 by shrink-fitting. The collar 44 has an inwardly extending circumferential rib 80 that is configured to abut a rear surface of the circumferential flange 50, such that the collar 44 and the dummy block base 40 engage each other in an interlocking manner. In the embodiment shown, the circumferential rib 80 has a forward surface abutting the rear surface of the circumferential flange 50, an inner surface abutting an outer surface of the dummy block base 40, and a rear surface abutting a forward surface of the collar support 42. The collar 44 also has a conical inner surface 82 that is inclined relative to the center axis 84 of the dummy block 30, and which defines a first angle with the center axis 84.

The collar support 42 comprises a generally annular body, and is coupled to the dummy block base 40 by shrink-fitting. The collar support 42 has a forward surface that abuts the collar 44, such that the collar 44 is seated against the collar support 42. In this manner, the circumferential rib 80 of the collar 44 is accommodated within an annular groove 88 defined between the collar support 42 and the dummy block base 40.

Figure 5:
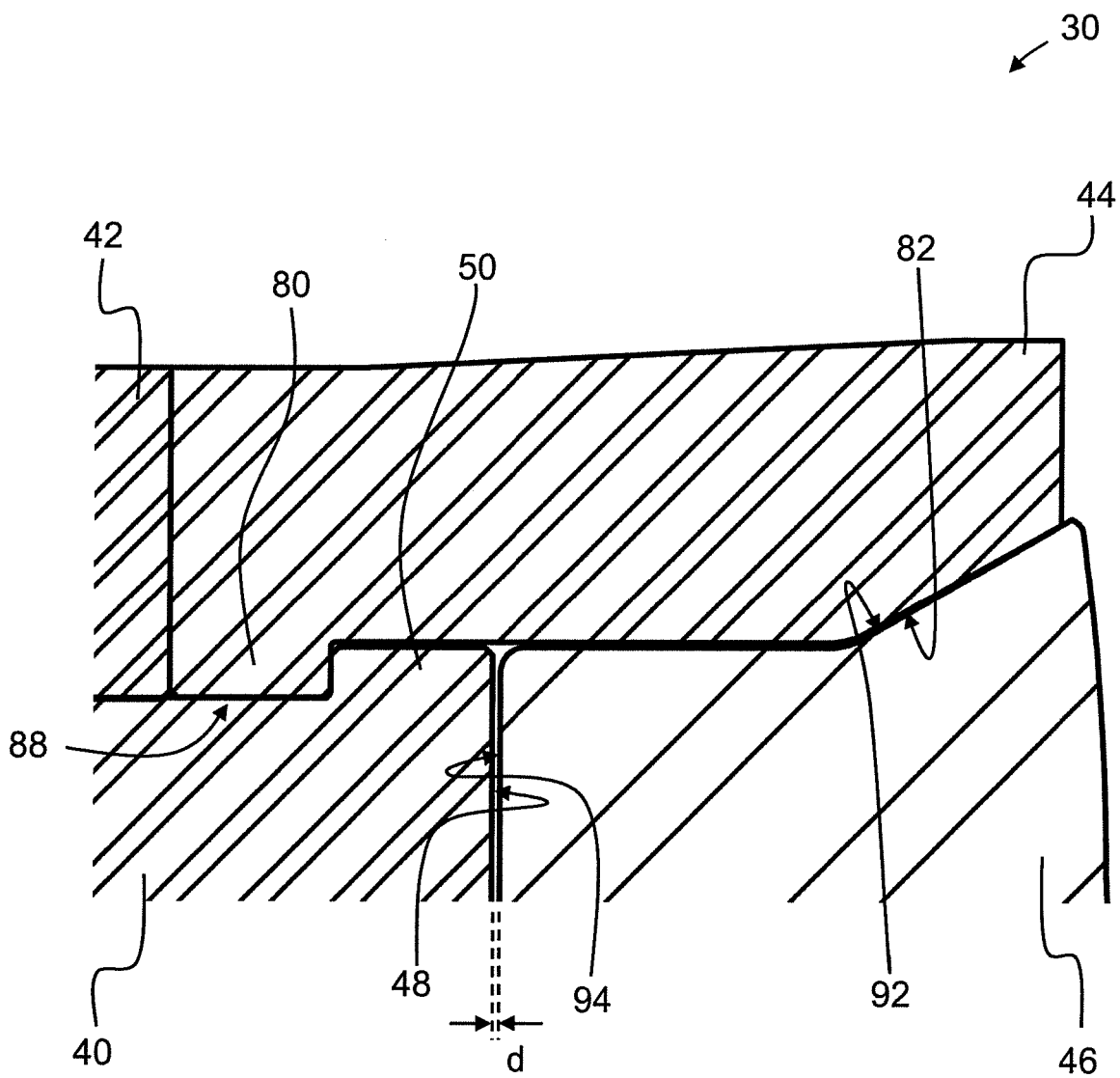
FIG. 5 is an enlarged fragmentary view of a portion of the dummy block of FIG. 4 identified by reference numeral 5.

The plunger 46 has a forward portion 89 defining a convex forward face 90 that is configured to abut a billet 26. The plunger 46 also has a conical outer surface 92 adjacent the convex face 90. The conical outer surface 92 is inclined relative to the center axis 84 of the dummy block 30, such that the conical outer surface 92 defines a second angle with the center axis 84. The plunger also has a rear portion 93 having a cylindrical shape and extending rearward from the forward portion 89, with the rear portion 93 defining a planar rear surface 94 that is configured to abut the forward surface 48 of the dummy block base 40. Extending rearward from the rear surface 94 is a post 96 that is shaped to extend through the center bore 52 and into the central recess 54 of the dummy block base 40. A connector 98 is fastened to a distal end of the post 96 within the central recess 54 for coupling the moveable plunger 46 to the dummy block base 40, and for providing a surface against which the spring 68 abuts. As shown in FIG. 5, the plunger 46 is shaped such that the planar rear surface 94 and the planar forward surface 48 are spaced by a distance "d" when the moveable plunger 46 is not depressed against the dummy block base 40.

The second angle defined by the conical outer surface 92 and the center axis 84 is slightly greater than the first angle defined by the conical inner surface 82 and the center axis 84, so as to ensure that the plunger 46 and the collar 42 do not become jammed during use. In the embodiment shown, the difference between the second angle and the first angle is about 1.5 degrees. As will be understood, if the angle of inclination of the conical outer surface 92 were the same as, or less than, the angle of inclination of the conical inner surface 82, these surfaces would jam as the plunger moves rearward into the collar 42 such that when the dummy block is removed from the container, the spring 68 would not have sufficient force to return the plunger 46 to its initial position.

Figure 6:
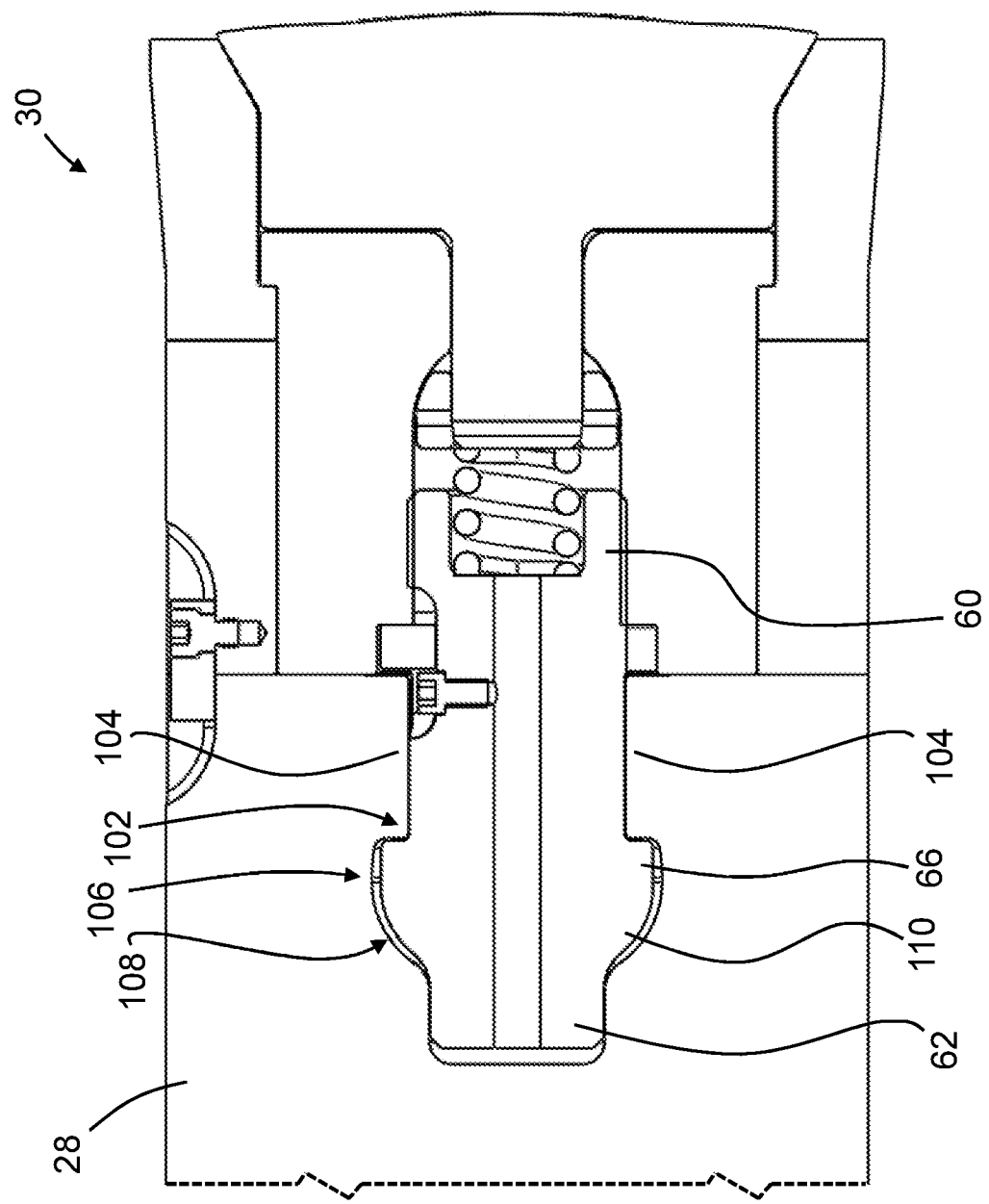
FIG. 6 is a side sectional view of the dummy block of FIG. 2 and a portion of an extrusion ram forming part of the metal extrusion press of FIG. 1.

A portion of the extrusion ram 28 is shown in FIG. 6. Extrusion ram 28 has a forward surface from which a central cavity 102 extends inwardly. The central cavity 102 is configured to matingly engage the stud 62 of the dummy block 30. The extrusion ram 28 has four (4) spaced-apart tabs 104 that project into the cavity 102, and that are configured to abut forward surfaces of the lugs 66 of the stud 62 when the stud 62 and dummy block 30 are rotated into position to matingly engage the extrusion ram 28. The central cavity 102 has a portion 106 configured to accommodate the lugs 66 of the stud 62, and which has concave rear surface 108 having a relatively large radius that eliminates stress concentration points within the extrusion ram 28. Additionally, each lug 66 has a tapered rear portion 110 that blends the rearward portion of the lug 66 into a central body of the stud 62, and which eliminates stress concentration points within the lug 66 and the stud 62.

During use, the extrusion ram 28 with the assembled dummy block 30 and stud 62 mounted thereon is advanced through a container 20 to force a billet 26 through the extrusion die 32. A forward force is applied by the extrusion ram 28 to the billet 26 via the dummy block 30. In return, an opposing force is applied by the billet 26 to the dummy block 30, which causes the plunger 46 to move rearward toward the dummy block base 40. During this rearward motion, the plunger 46 applies pressure against the conical inner surface 82 of the collar 44, causing the collar 44 to expand outwardly to accommodate the plunger 46. The plunger 46 continues to move rearward toward the dummy block base 40 and to expand the collar 44 until the planar rear surface 94 of the plunger 46 abuts against the planar forward surface 48 of the dummy block base 40. With the dummy block base 40 and plunger 46 abutting in this manner, the force applied by the extrusion ram 28 can be transferred directly through the core of the dummy block 30 to the billet. At the end of the stroke, the extrusion ram 28 with the dummy block 30 mounted thereon is returned to its starting position in the container 20 to receive the next billet. With the opposing force previously applied by the billet 26 now removed, the spring 68 pushes the plunger 46 forward to its initial position, which in turn causes the collar 44 to contract to its original size.

As will be appreciated, the configuration of the dummy block 30, and in particular the coupling of the dummy block base 40, the collar support 42 and the collar 44, eliminates the need for lengthy bayonet connector lugs extending from the base that would otherwise be needed to for a conventional bayonet-style connection. As a result, the diameter of the dummy block base 44, and in turn the contact area between the dummy block base 40 and the plunger 46 (sometimes referred to as "pad area"), are greater than those of conventional dummy blocks. Additionally, the circumferential flange 50 further increases the pad area, and provides a greater contribution to pad area than what would otherwise be provided by discrete, lengthy bayonet connector lugs. The increased pad area advantageously allows a greater amount of force applied by the extrusion ram 28 to be transferred through the core of the dummy block 30 to the billet 26, as compared to conventional dummy blocks having bayonet-style connections. This configuration advantageously enables the dummy block 30 to be operated at higher extrusion pressures than conventional dummy blocks.

As will be appreciated, the configuration of the dummy block 30, and in particular the coupling of the dummy block base 40, the collar support 42 and the collar 44 eliminates the need the need for an outer connecting ring coupling the collar to the dummy block. This configuration, which therefore has an absence of a connecting ring, advantageously provides a more robust and therefore more reliable coupling of the collar 44, which increases the service life of the dummy block 30, as compared to conventional dummy blocks having outer connecting rings.

As will be appreciated, the concave rear surface 108 of the portion 106 of the central cavity 102 accommodating the lugs 66 reduces stress within the extrusion ram 28, which advantageously enables the extrusion ram 28 to supply higher forward extrusion forces than conventional extrusion rams, which in turn enables the dummy block 30 to be operated at higher extrusion pressures than conventional dummy blocks.

Although in the embodiment described above, the collar support and the collar are each coupled to the dummy block base by shrink-fitting, in other embodiments, one or both of the collar and the collar support may alternatively be coupled to the dummy block base in other ways, such as by one or more fasteners, for example.

Although embodiments have been described above with reference to the accompanying drawings, those of skill in the art will appreciate that variations and modifications may be made without departing from the scope thereof as defined by the appended claims.

What is claimed is:

1. A dummy block for a metal extrusion press comprising:
a generally cylindrical base having a planar forward surface and an outwardly extending circumferential flange;
an expandable collar coupled to the base, the collar having an inwardly extending circumferential rib abutting the circumferential flange;
a collar support coupled to the base and abutting the collar; and
a moveable plunger coupled to the base and accommodated by the collar, the plunger comprising
a forward portion having a frustoconical shape and defining a forward face configured to abut a billet during use, and
a rear portion having a cylindrical shape and extending rearward from the forward portion, the rear portion defining a planar rear surface configured to abut the planar forward surface of the base, the planar rear surface and the planar forward surface having equal areas and equal diameters.

2. The dummy block of claim 1, wherein the collar support and the base define an annular groove accommodating the circumferential rib.

3. The dummy block of claim 1, wherein the circumferential rib has a forward rib surface abutting a rear flange surface of the circumferential flange.

4. The dummy block of claim 3, wherein the collar and the dummy block base engage each other in an interlocking manner.

5. The dummy block of claim 1, wherein one or both of the collar and the collar support are coupled to the base by shrink-fitting.

6. The dummy block of claim 1, wherein the circumferential flange defines a portion of the forward surface.

7. The dummy block of claim 1, wherein the forward face is a convex face.

8. The dummy block of claim 1, further comprising a rearward-extending stud or elongate projection for connecting the dummy block to an extrusion ram.

9. The dummy block of claim 8, wherein the stud or elongate projection comprises a central body and a plurality of lugs extending therefrom, each lug having a tapered rear portion blending the lug into the central body.

10. A metal extrusion press comprising the dummy block of claim 1.

11. A metal extrusion press comprising:
a dummy block having:
a generally cylindrical base having a planar forward surface and an outwardly extending circumferential flange,
an expandable collar coupled to the base, the collar having an inwardly extending circumferential rib abutting the circumferential flange,
a collar support coupled to the base and abutting the collar, and
a moveable plunger coupled to the base and accommodated by the collar, the plunger comprising a forward portion having a frustoconical shape and defining a forward face configured to abut a billet during use, and a rear portion having a cylindrical shape and extending rearward from the forward portion, the rear portion defining a planar rear surface configured to abut the planar forward surface of the base, the planar rear surface and the planar forward surface having equal areas and equal diameters;

a stud or elongate projection coupled to the base; and an extrusion ram abutting the dummy block and having a central cavity accommodating the stud or elongate projection, a portion of the central cavity having a concave rear surface.

12. The metal extrusion press of claim 11, wherein the stud or elongate projection comprises a central body and a plurality of lugs extending therefrom, and wherein the portion of the central cavity having the concave rear surface is configured to accommodate the lugs.

13. The metal extrusion press of claim 12, wherein each of the lugs has a tapered rear portion blending the lug into the central body.

14. The metal extrusion press of claim 11, wherein the collar support and the base define an annular groove accommodating the circumferential rib.

15. The metal extrusion press of claim 11, wherein the circumferential rib has a forward rib surface abutting a rear flange surface of the circumferential flange.

16. The metal extrusion press of claim 15, wherein the collar and the dummy block base engage each other in an interlocking manner.

17. The metal extrusion press of claim 11, wherein one or both of the collar and the collar support are coupled to the base by shrink-fitting.

18. The metal extrusion press of claim 11, wherein the circumferential flange defines a portion of the forward surface.

19. The metal extrusion press of claim 11, wherein the forward face is a convex face.

* * * * *